United States Patent
Andtbacka et al.

(10) Patent No.: US 6,666,945 B1
(45) Date of Patent: Dec. 23, 2003

(54) PREPARATION OF AN END OF A THERMOPLASTICS TUBE MANUFACTURED BY SPIRALLY WINDING A HOLLOW PROFILE

(75) Inventors: Anders Andtbacka, Vasa (FI); Gunnar Blomqvist, Helsingby (FI); Stefan Slotte, Vasa (FI)

(73) Assignee: Oy KWH Pipe Ab, Helsinki (FI)

( * ) Notice: Subject to any disclaimer, the term of this patent is extended or adjusted under 35 U.S.C. 154(b) by 0 days.

(21) Appl. No.: 09/958,314

(22) PCT Filed: Mar. 29, 2000

(86) PCT No.: PCT/FI00/00267

§ 371 (c)(1),
(2), (4) Date: Oct. 9, 2001

(87) PCT Pub. No.: WO00/61978

PCT Pub. Date: Oct. 19, 2000

(30) Foreign Application Priority Data

Apr. 9, 1999 (FI) .................................................. 990775

(51) Int. Cl.[7] .............................. F16L 9/18; B29C 57/00
(52) U.S. Cl. ............................... 156/304.2; 156/304.3; 156/304.5; 156/244.13; 156/258; 156/191
(58) Field of Search ........................... 156/304.2, 304.3, 156/304.5, 304.6, 244.13, 258, 191, 193, 194

(56) References Cited

U.S. PATENT DOCUMENTS 5,127,442 A  *  7/1992 Blomqvist .................. 138/154
5,429,397 A     7/1995 Kanao ........................ 285/288
5,609,713 A     3/1997 Kime et al. ............... 156/304.2
5,730,474 A  *  3/1998 Bank .......................... 285/110
5,836,621 A  * 11/1998 Campbell ................... 285/21.2
6,322,653 B1 * 11/2001 Blomqvist .................. 156/221

FOREIGN PATENT DOCUMENTS

DE  44 32 199 A1   3/1996
EP  0 540 770 A1   5/1993
FI     103607 B    5/1998

* cited by examiner

Primary Examiner—Jeff H. Aftergut
Assistant Examiner—Todd J. Kilkenny
(74) Attorney, Agent, or Firm—Connolly Bove Lodge & Hutz LLP

(57) ABSTRACT

A method for preparing an end of a thermoplastics tube (1) is provided, wherein the tube is manufactured by spirally winding and welding together of a hollow profile (1a) having a substantially rectangular cross section. The method includes the following steps: cutting the end of the tube by a planar transversal section; extruding a second hollow profile (2) having a rectangular cross section and an outer shape essentially similar to Fat of the hollow profile (1a) from which the tube (1) is manufactured; spirally winding the extruded second hollow profile (2) around a drum having a diameter corresponding to inner diameter of the tube (1); cutting a loop (2a) from the second hollow profile (2) in a length corresponding to circumference of the tube end; joining the ends of the loop (2a) to each other, whereby a ring (2b) is formed having the same inner and outer diameters as the spirally wound tube (1); placing the ring (2b) against the cut tube end; and welding the ring (2b) to the tube end.

6 Claims, 2 Drawing Sheets

Figure 1:
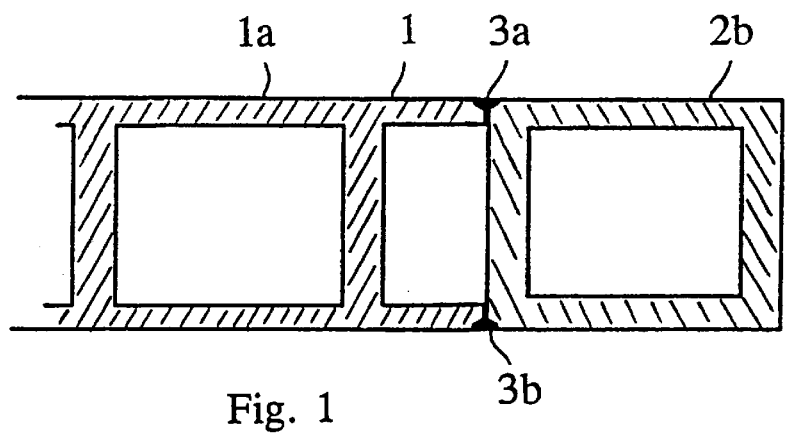

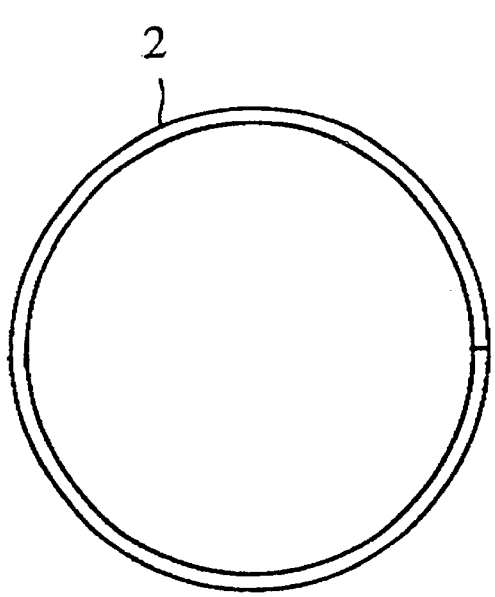
Fig. 4a Fig. 4b
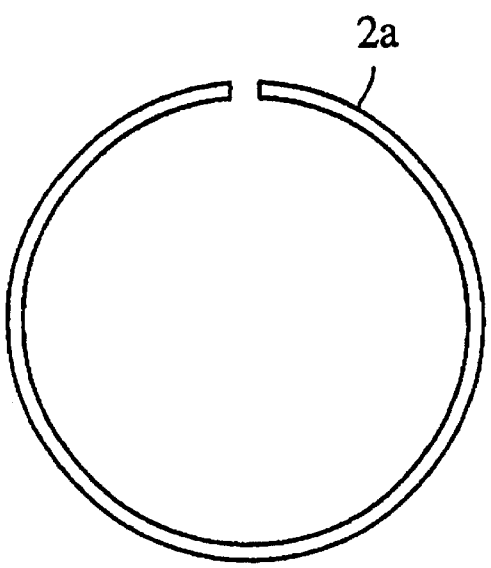
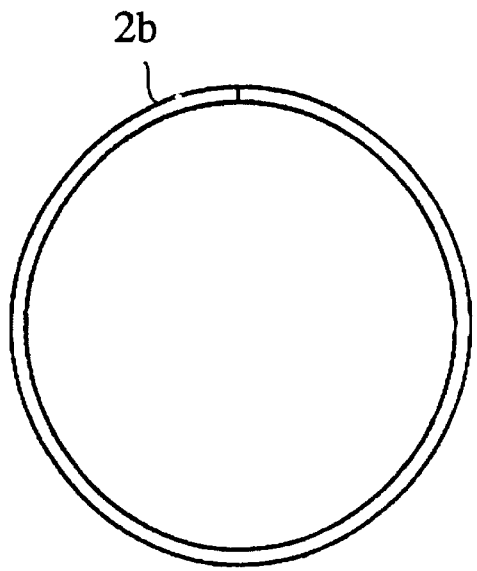
Fig. 5 Fig. 6

PREPARATION OF AN END OF A THERMOPLASTICS TUBE MANUFACTURED BY SPIRALLY WINDING A HOLLOW PROFILE

This invention concerns a method for preparing a thermoplastics tube manufactured by spirally winding and welding together of a hollow profile having a substantially rectangular cross section.

A drawback of spirally wound tubes of the above mentioned type is that on cutting the tube no unbroken cutting surface is received, but the cutting surface comprises only an outer and an inner edge as well as two short portions where the cut passes through radially directed side walls of the hollow profile. This results in that dirt easily will penetrate into the spirally extending cavity between the inner and outer wall of the tube and further, joining of these tubes will become difficult due to relatively thin and unevenly applied material thickness in a cut tube end.

Previously attempts have been done to overcome this, for instance according to EP-A 0 540 770, by turning a groove of uniform width and depth between the outer and the inner tube wall in an end of a spirally wound double wall tube, and then heating the plastics material in the tube walls defining the turned groove. A specially made mould sealing ring is possibly inserted in the turned groove, and then the heated tube end with or without said sealing ring is inserted into a conically tapering groove in an annular mould, whereby the tube end will get a wished shape. If no sealing ring is used the tube end must, after cooling, still be provided with a welding seam closing a narrow gap between the outer and inner tube walls, which gap will remain when the tube end has been moulded. This previously known method is primarily intended to mould and prepare a male and a female end of a socket pipe. A drawback of the method is that it requires a lot of extra measures in the tube end and comprises a lot of time consuming working steps as well as specially made accessories.

A considerably simplified method is described in the Finnish patent application No. 964518, in which a cut tube end is heated until the plastics material is changed into a plastic condition, and then the tube end is inserted into an annular groove in a press mould corresponding to the cross section of the tube and is exerted to an axially directed pushing force. The plastics material in the end of the tube is hereby pressed together so that a continuous planar end face is achieved. According to another embodiment a string of molten plastics mass is extruded onto the bottom of the annular groove before the tube end is inserted. This method is relatively suitable for spirally wound tubes having small diameters, but when the dimensions of the tubes increase this method will be too clumsy.

The object of the present invention is to provide a method which is as suitable for large as for small spirally wound tubes, and which will result in tube ends which may be joined together according to same methods as solid tubes. This is achieved by a method, which is characterized by the steps as follow:

cutting the end of the tube by a planar transverse section;

extruding a second hollow profile having a rectangular cross section and an outer shape essentially similar to that of the hollow profile from which the tube is manufactured;

spirally winding the extruded second hollow profile around a drum having a diameter corresponding to inner diameter of the tube;

cutting a loop from the second hollow profile in a length corresponding to circumference of the tube end;

joining the ends of the loop to each other, whereby a ring is achieved having same inner and outer diameters as the spirally wound tube;

placing the ring against the cut tube end, and welding the ring to the tube end.

The second hollow profile is preferably manufactured with a somewhat larger wall thickness than the hollow profile of the tube itself. In tubes produced from small profiles the second profile is therefore suitably extruded as a solid profile without cavity.

Further features of the invention will appear from the dependent claims 3 to 6.

Figure 2:
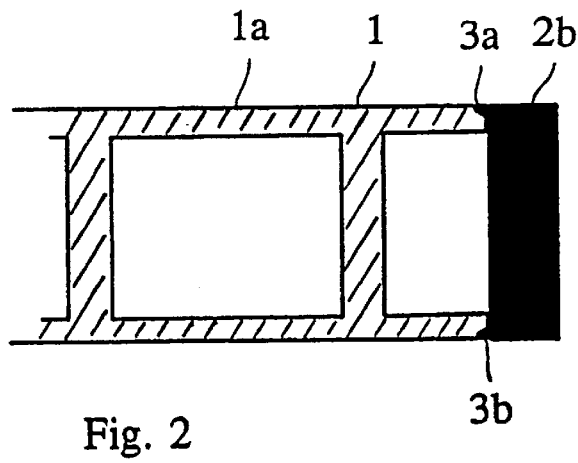
Figure 3:
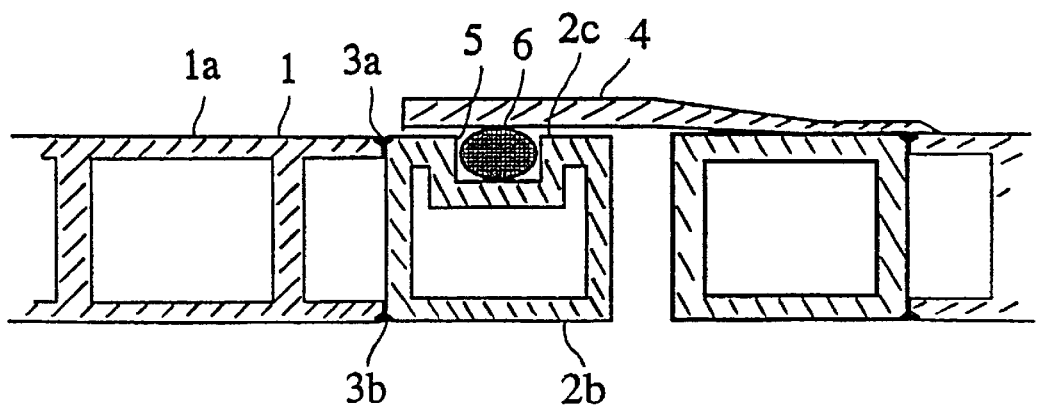

Below the invention will be described in more detail with reference to the enclosed drawing, in which FIG. 1 shows schematically a longitudinal section through the tube wall in the end of a tube, the end of which is prepared according to the invention, FIG. 2 shows a longitudinal section through the tube wall in the end of another tube, the end of which is prepared according to the invention, FIG. 3 shows a further example of a longitudinal section through the tube wall in the end of a tube, end prepared according to the invention, FIGS. 4a and 4b show schematically an axial view and a side view, respectively, of the extruded and spirally wound second hollow profile for the end preparation, FIG. 5 shows a loop cut from the spirally wound second hollow profile in FIGS. 4a and 4b and FIG. 6 shows the loop in FIG. 5 welded together to an end ring.

According to the invention the end preparation of a thermoplastics tube 1, produced by spirally winding and welding together of hollow profile 1a having a substantially rectangular cross section, is carried out by initially cutting the end of the tube 1 in a planar transverse section. A second hollow profile 2, having a rectangular cross section and an outer shape substantially similar to that of the hollow profile 1a from which the tube 1 is produced, is extruded and spirally wound around a drum having a diameter corresponding to the inner diameter of the tube 1. No welding together of adjacent windings is carried out, but the second hollow profile 2 takes a shape mainly corresponding to a spring, as shown in FIG. 4b. For each tube end a loop 2a is then cut from the spirally wound second hollow profile 2, in a length corresponding to circumference of the tube 1 or tube end (FIG. 5). Both ends of the loop 2a are then welded together so that a ring 2b is formed (see FIG. 6). having an outer and an inner diameter equal to those of the tube 1 itself The ring is then placed against the cut tube end and is welded to it by an inner and an outer weld seam 3a, 3b, whereby an impact proof and closed tube end is formed. The closed tube end can be joined to another similar tube end according to same methods as those being used in joining solid tubes, i.e. by stub welding, electro welding using a disk like welding ring, by extrusion welding or a sleeve joint.

When the tube ends are intended to be joined together by means of a sleeve joint the end of one tube will be provided with a socket 4 in a way known as such and the tube profile 2 for the end of the other tube is extruded through a nozzle arranged to produce longitudinal grooves 5 in that side wall 2c of the hollow profile 2, which during the subsequent spirally winding is positioned outermost forming an outer mantle of the coil and hence of the ring 2b, too. An elastic sealing ring 6, such as an O-ring or a lip like ring can then be positioned into the groove 5, before the tube end is pushed into the socket 4. This is schematically shown in FIG. 3.

In order to receive as good strength as possible in the pipe end, the second hollow profile 2 is preferably extruded with a somewhat larger wall thickness than the hollow profile from which the tube 1 itself is produced. When the tube is built up of small hollow profiles this will result in that the cavity of the second hollow profile 2 will completely disappear and a solid profile is received, as schematically shown in FIG. 2.

The most elegant way to join the ends of a loop 2a cut from the second hollow profile 2 is by stub welding, while the most simple way to weld the thus received ring 2b to the tube end is by means of extrusion welding.

What is claimed is:

1. A method for preparing an end of a thermoplastics tube manufactured by spirally winding and welding together of a first hollow profile having a substantially rectangular cross section, comprising:

cutting the end of the tube by a planar transverse section;

extruding a second hollow profile having a rectangular cross section and an outer shape essentially similar to that of the first hollow profile;

spirally winding the extruded second hollow profile around a drum having a diameter corresponding to inner diameter of the tube;

cutting a loop from the second hollow profile in a length corresponding to a circumference of the end of the tube;

joining ends of the loop to each other, whereby a ring is formed having inner and outer diameters equal to inner and outer diameters of the spirally wound tube;

placing the ring against the cut end of the tube; and welding the ring to the end of the tube.

2. A method according to claim 1, wherein the second hollow profile is extruded with a larger wall thickness than the hollow profile for the tube itself.

3. A method according to claim 1, wherein the ends of the cut loop are joined together by stub welding.

4. A method according to claim 1, wherein the ring is welded to the end of the tube by extrusion welding.

5. A method according to claim 1, wherein a side wall of the second hollow profile is shaped during extrusion to include a longitudinal groove, and wherein the side wall forms an outer mantle of the end of the tube.

6. A method for preparing an end of a thermoplastics tube manufactured by spirally winding and welding together of a first hollow profile having a substantially rectangular cross section, comprising:

cutting the end of the tube by a planar transverse section;

extruding a second hollow profile having a rectangular cross section and an outer shape essentially similar to that of the first hollow profile, wherein the second hollow profile has a wall thickness that is greater than a wall thickness of the first hollow profile;

spirally winding the extruded second hollow profile around a drum having a diameter corresponding to inner diameter of the tube;

cutting a loop from the second hollow profile in a length corresponding to a circumference of the end of the tube;

joining ends of the loop to each other, whereby a ring is formed having inner and outer diameters equal to inner and outer diameters of the spirally wound tube;

placing the ring against the cut end of the tube; and welding the ring to the end of the tube so as to convert the second hollow profile into a solid profile.

\* \* \* \* \*